United States Patent
Ono

(10) Patent No.: US 9,235,091 B2
(45) Date of Patent: Jan. 12, 2016

(54) LIQUID CRYSTAL DISPLAY DEVICE AND MANUFACTURING METHOD THEREOF

(71) Applicant: Panasonic Liquid Crystal Display Co., Ltd., Himeji-shi, Hyogo (JP)

(72) Inventor: Kikuo Ono, Ibaraki (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 0 days.

(21) Appl. No.: 14/200,035

(22) Filed: Mar. 7, 2014

(65) Prior Publication Data

US 2015/0192833 A1   Jul. 9, 2015

(30) Foreign Application Priority Data

Jan. 8, 2014   (JP) .................................. 2014-001423

(51) Int. Cl.
 *G02F 1/1362* (2006.01)

(52) U.S. Cl.
 CPC .... *G02F 1/136286* (2013.01); *G02F 1/136213* (2013.01); *G02F 2001/136218* (2013.01)

(58) Field of Classification Search
 CPC ..................... G02F 1/136286; G02F 1/136213; G02F 2001/134372; G02F 1/134363
 See application file for complete search history.

(56) References Cited

U.S. PATENT DOCUMENTS

| | | | |
|---|---|---|---|
| 6,226,060 B1 * | 5/2001 | Onisawa et al. ................. 349/43 |
| 6,249,326 B1 * | 6/2001 | Hebiguchi ....................... 349/42 |
| 6,781,658 B1 * | 8/2004 | Choi ................. G02F 1/133553 349/139 |
| 6,784,949 B1 * | 8/2004 | Nagata et al. .................... 349/39 |
| 8,330,917 B2 * | 12/2012 | Park et al. ...................... 349/139 |
| 8,405,787 B2 * | 3/2013 | Liu et al. ......................... 349/39 |
| 2003/0098934 A1 * | 5/2003 | Lee et al. ......................... 349/39 |
| 2003/0122988 A1 * | 7/2003 | Kim et al. ........................ 349/43 |
| 2004/0125259 A1 * | 7/2004 | Cho .................. G02F 1/136259 349/43 |
| 2005/0157220 A1 * | 7/2005 | Kim .................. G02F 1/136259 349/38 |
| 2009/0207362 A1 * | 8/2009 | Nagano et al. ................. 349/139 |
| 2009/0237342 A1 | 9/2009 | Maede et al. |
| 2012/0127389 A1 | 5/2012 | Nagami |

FOREIGN PATENT DOCUMENTS

| | | |
|---|---|---|
| JP | 2009-223245 A | 10/2009 |
| JP | 2012-113090 A | 6/2012 |

* cited by examiner

*Primary Examiner* — Dennis Y Kim

(74) *Attorney, Agent, or Firm* — Hubbs, Enatsky & Inoue PLLC

(57) ABSTRACT

Provided is a liquid crystal display device, including: a first substrate and a second substrate. On the second substrate, a plurality of gate signal lines, a plurality of data signal lines, a plurality of pixel electrodes provided correspondingly to a plurality of pixels, and a common electrode provided so as to be opposed to the pixel electrodes are formed. An interline pitch of the gate signal lines is smaller than an interline pitch of the data signal lines. In each of the pixels, the pixel electrode overlaps, in plan view, gate signal lines adjacent to the pixel electrode.

4 Claims, 16 Drawing Sheets

$$\Delta V_{sf} = \frac{C_{gs} - C_{add}}{C_{gs} + C_{stg} + C_{lc} + 2C_{ds} + C_{add}} \times \Delta V_g$$

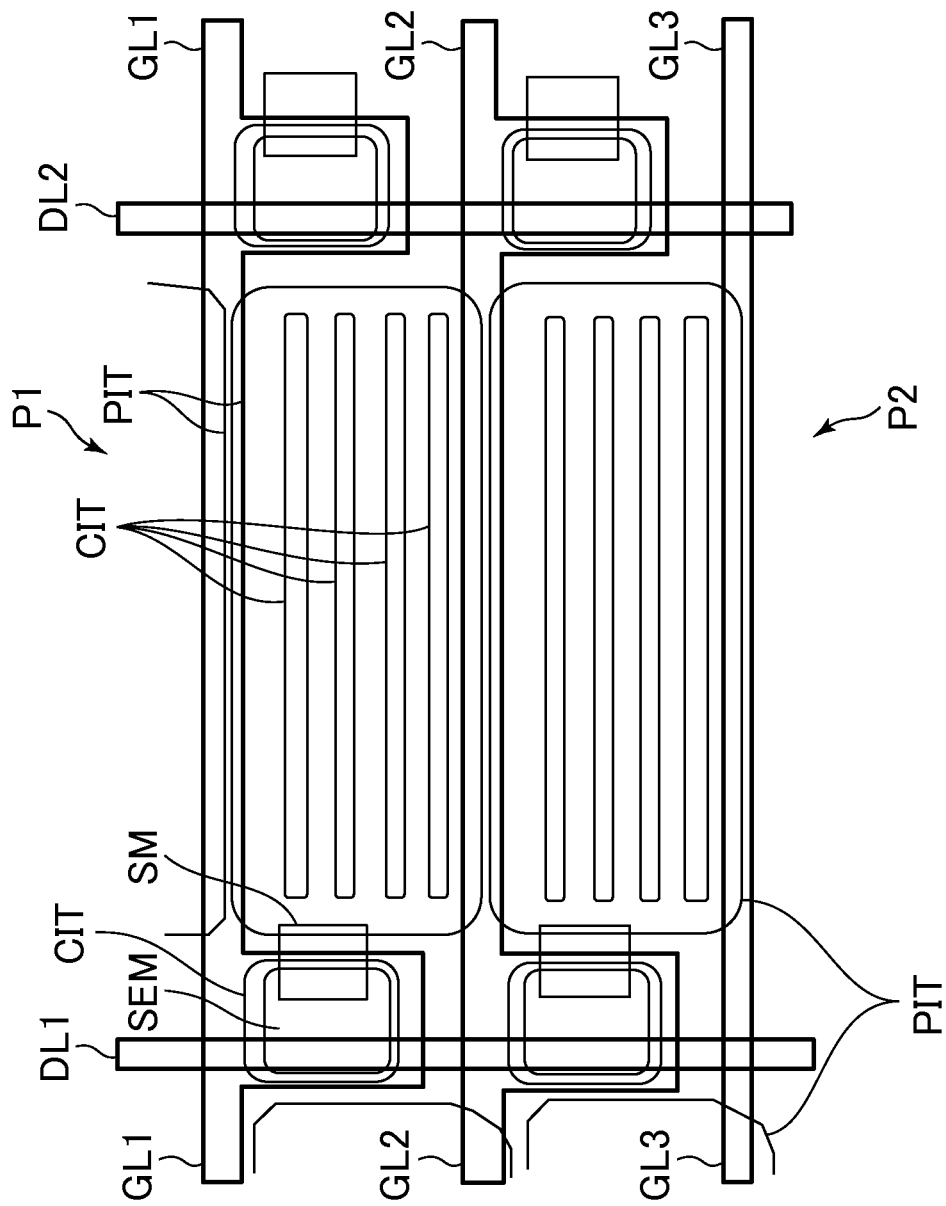

LIQUID CRYSTAL DISPLAY DEVICE AND MANUFACTURING METHOD THEREOF

CROSS-REFERENCE TO RELATED APPLICATION

The present application claims priority from Japanese application JP 2014-001423 filed on Jan. 8, 2014, the content of which is hereby incorporated by reference into this application.

TECHNICAL FIELD

The present application relates to a liquid crystal display device, and more particularly, to an in-plane switching (IPS) liquid crystal display device and a manufacturing method thereof.

BACKGROUND

An IPS liquid crystal display device (see, for example, Japanese Patent Application Laid-open No. 2012-113090) includes, on at least one of a pair of substrates arranged so as to be opposed to each other via liquid crystal, a pixel electrode and a common electrode in each pixel region on the liquid crystal side. In this configuration, an electric field in a direction parallel to the substrate (lateral electric field) is generated between the pixel electrode and the common electrode so that the lateral electric field is applied to the liquid crystal to drive the liquid crystal. In this manner, the amount of light passing through the region between the pixel electrode and the common electrode is controlled to display an image. The IPS liquid crystal display device has an advantage in that display change is small even when the device is viewed from a direction oblique to a display surface, that is, the device is excellent in so-called wide viewing angle characteristics.

SUMMARY

However, in the related-art IPS liquid crystal display device, a parasitic capacitor is liable to be formed between a pixel electrode and two data signal lines adjacent thereto on the right and on the left. There is a problem in that, due to this parasitic capacitor, a pixel potential may fluctuate to cause display unevenness. Further, hitherto, a typical method of reducing the capacitance of the parasitic capacitor is to increase the distance between the pixel electrode and the two data signal lines adjacent thereto on the right and on the left. However, this method causes a problem in that the aperture ratio of the pixel may reduce.

The present invention has been made in view of the above, and an object of the present invention is to improve the aperture ratio of a pixel while reducing display unevenness in an IPS liquid crystal display device.

In one general aspect, the present application describes a liquid crystal display device that includes a first substrate on a display surface side and a second substrate on a rear surface side, the first substrate and the second substrate being placed so as to be opposed to each other with liquid crystal interposed therebetween. The second substrate includes a plurality of gate signal lines formed thereon, each of which extends in a row direction; a plurality of data signal lines formed thereon, each of which extends in a column direction; a plurality of pixel electrodes formed thereon, which are provided correspondingly to a plurality of pixels arranged in the row direction and the column direction; and a common electrode formed thereon, which is provided on the display surface side so as to be opposed to the plurality of pixel electrodes. An interline pitch of the plurality of gate signal lines is smaller than an interline pitch of the plurality of data signal lines. In each of the plurality of pixels, the pixel electrode overlaps, in plan view, at least one of two of the plurality of gate signal lines adjacent to the pixel electrode.

The above general aspect may include one or more of the following features. In the each of the plurality of pixels, the pixel electrode in a first pixel may overlap, in plan view, a gate signal line of the plurality of gate signal lines which is adjacent to the gate signal line for driving the first pixel.

In the each of the plurality of pixels, the pixel electrode in a first pixel may overlap, in plan view, a gate signal line of the plurality of gate signal lines which is scanned next to the gate signal line for driving the first pixel.

In the each of the plurality of pixels, the pixel electrode in a first pixel further may overlap, in plan view, the gate signal line for driving the first pixel.

In the each of the plurality of pixels, in plan view, an overlapping area of the pixel electrode in a first pixel and the gate signal line for driving the first pixel may be smaller than an overlapping area of the pixel electrode in the first pixel and the gate signal line being scanned next to the gate signal line for driving the first pixel.

In the each of the plurality of pixels, the gate signal line may overlap, in plan view, two of the plurality of pixel electrodes which are adjacent to each other in the column direction.

In the each of the plurality of pixels, in plan view, the pixel electrode in a first pixel may overlap and extend to across the gate signal line being scanned next to the gate signal line for driving the first pixel.

The plurality of pixel electrodes may be formed on an insulating film for covering the plurality of gate signal lines.

The liquid crystal display device may further include a plurality of colored portions formed on the second substrate, which are arranged correspondingly to the plurality of pixels, respectively. The plurality of colored portions may be arranged so that the colored portions of the same color are arranged in the row direction and the colored portions of different colors are periodically arranged in the column direction.

In another general aspect, the present application describes a method of manufacturing a liquid crystal display device that includes forming gate signal lines on a substrate; forming a first insulating film so as to cover the gate signal lines; forming, on the first insulating film, a pixel electrode so as to overlap a part of the gate signal lines adjacent to each other in a scanning direction; forming, on the first insulating film, data signal lines so that an interline pitch thereof is smaller than an interline pitch of the gate signal lines; forming a second insulating film so as to cover the data signal lines and the pixel electrode; and forming a common electrode on the second insulating film.

BRIEF DESCRIPTION OF THE DRAWINGS

FIG. 10 is a plan view illustrating another structure of the two pixels P1 and P2.

DETAILED DESCRIPTION

Embodiments of the present application are described below with reference to the drawings.

First Embodiment

Figure 1:
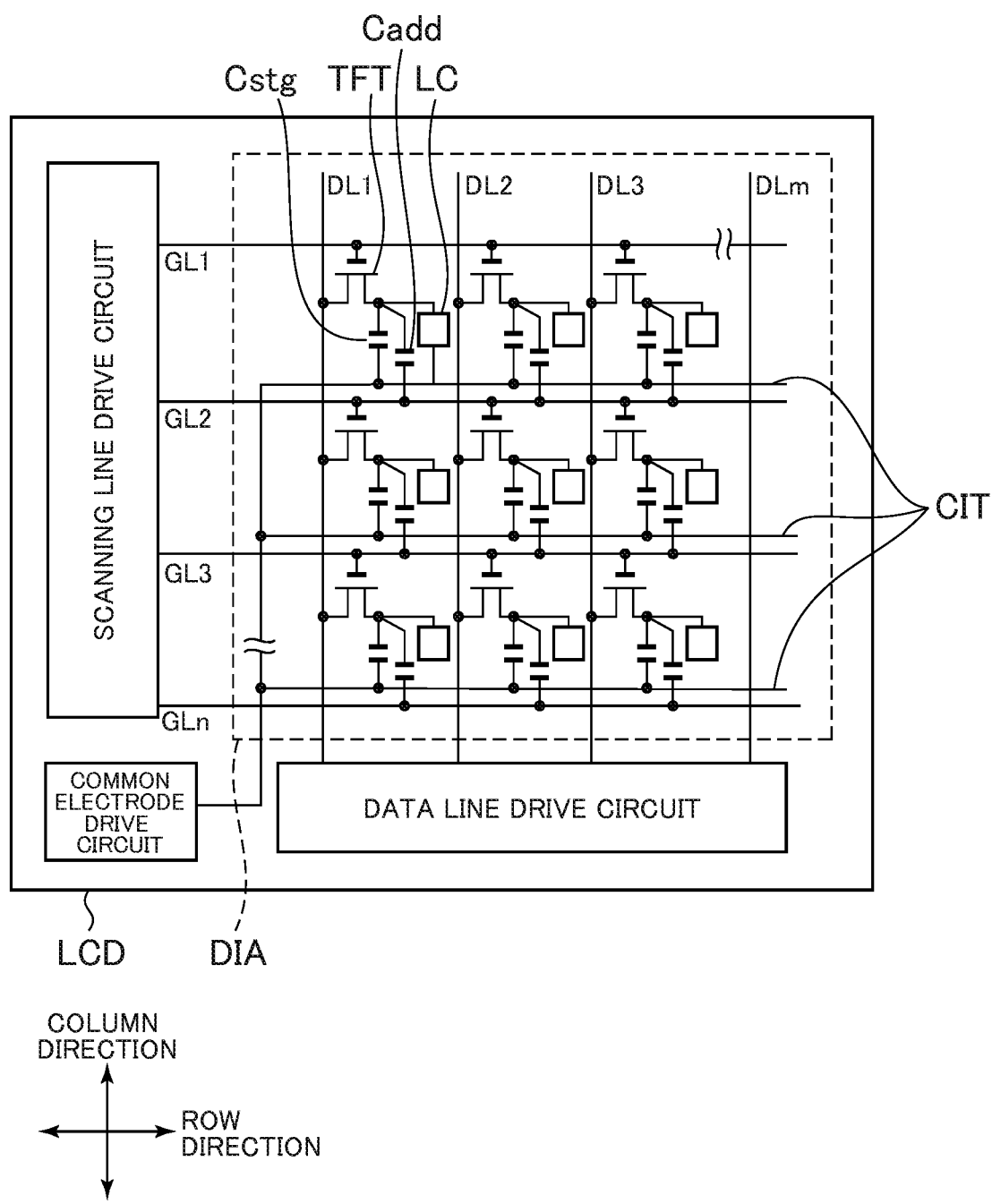
FIG. 1 illustrates an entire structure of a liquid crystal display device according to a first embodiment of the present application.

FIG. 1 illustrates an entire structure of a liquid crystal display device according to a first embodiment of the present application. A liquid crystal display device LCD includes an image display region DIA and a driving circuit region for driving the image display region DIA. In the image display region DIA, a plurality of pixel regions surrounded by adjacent gate signal lines GL and adjacent data signal lines DL are arranged in matrix in a row direction and a column direction. Note that, a direction in which the gate signal line GL extends is referred to as a row direction and a direction in which the data signal line DL extends is referred to as a column direction.

Active matrix display is carried out in each of the pixel regions. Specifically, a gate voltage is supplied from a scanning line drive circuit to gate signal lines (scanning lines) GL1, GL2, ... GLn, a data voltage is supplied from a data line drive circuit to data signal lines DL1, DL2, ... DLm, and a common voltage is supplied from a common electrode drive circuit to a transparent common electrode CIT. By on/off of a thin film transistor TFT by means of the gate voltage, the data voltage is supplied to a transparent pixel electrode PIT. By driving a liquid crystal layer LC by means of an electric field generated by the difference between the data voltage supplied to the transparent pixel electrode PIT and the common voltage supplied to the transparent common electrode CIT, transmittance of light is controlled to display an image.

A storage capacitor Cstg is formed in each of the pixel regions for the purpose of preventing voltage drop in the liquid crystal layer LC. The storage capacitor Cstg is formed in a region in which the transparent pixel electrode PIT and the transparent common electrode CIT overlap each other via an insulating film (protective insulating film PAS; second insulating film) (see FIG. 4).

Figure 2:
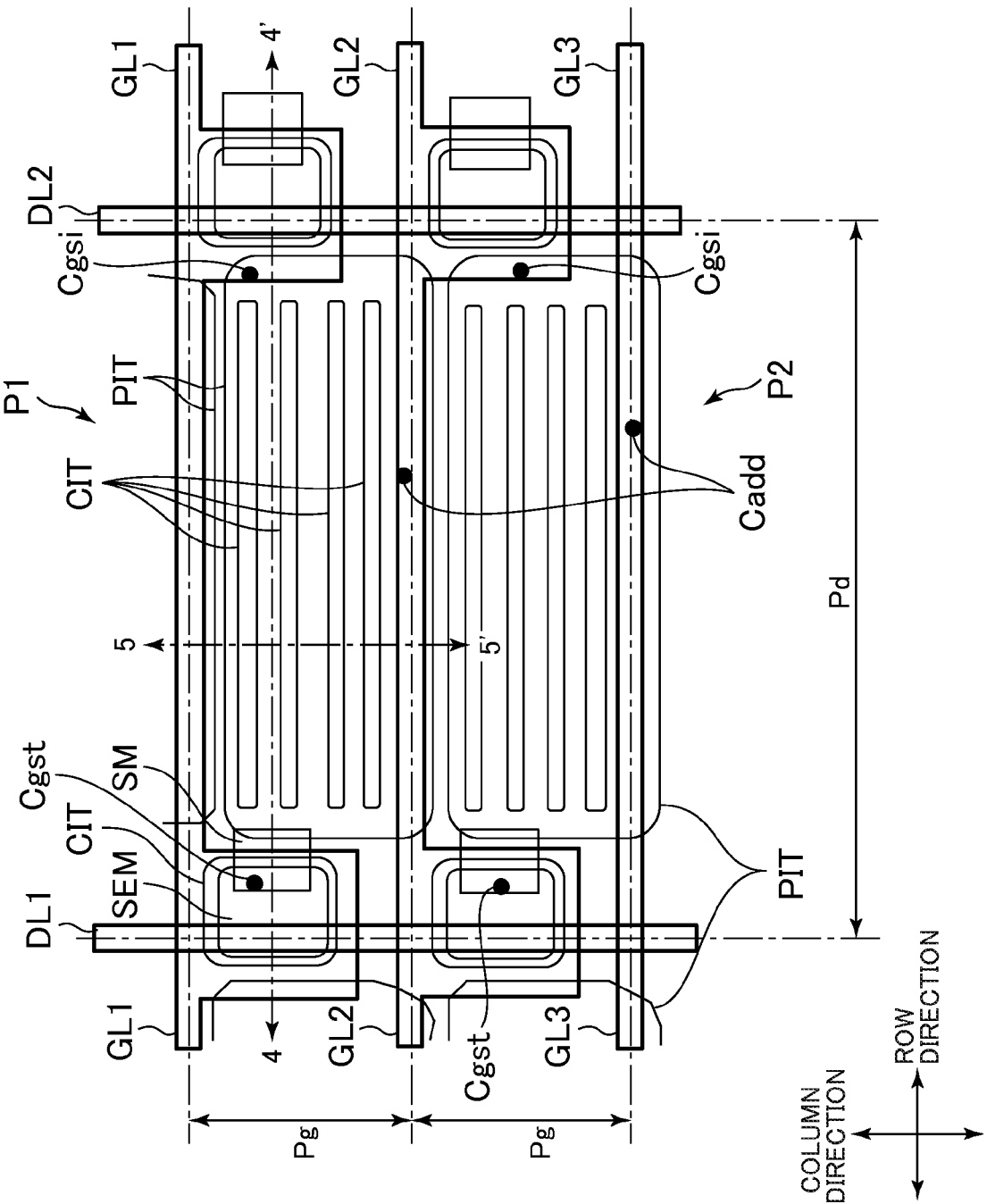
FIG. 2 is a plan view illustrating a structure of two pixels P1 and P2 in a liquid crystal display panel according to the first embodiment.

FIG. 2 is a plan view illustrating a structure of two pixels P1 and P2 in the liquid crystal display panel according to the first embodiment. FIG. 2 illustrates a pixel region surrounded by adjacent gate signal lines GL1 and GL2 and adjacent data signal lines DL1 and DL2 and a pixel region surrounded by adjacent gate signal lines GL2 and GL3 and the adjacent data signal lines DL1 and DL2.

Figure 3:
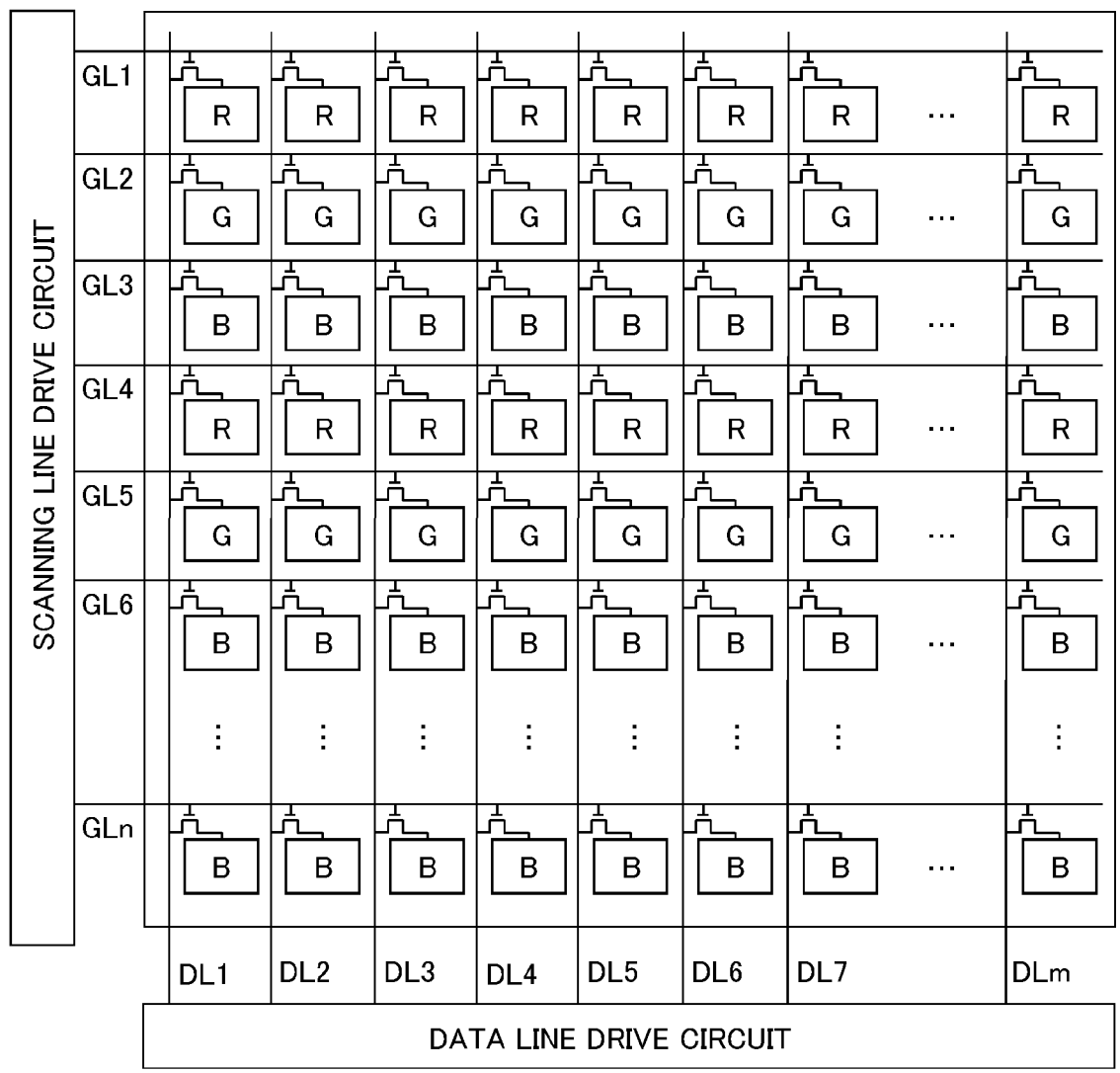
FIG. 3 is a plan view illustrating an exemplary pixel arrangement.

The gate signal lines GL extend in the row direction and are arranged with an interline pitch Pg in the column direction. The data signal lines DL extend in the column direction and are arranged with an interline pitch Pd in the row direction. The interline pitch Pg of the gate signal lines GL is smaller than the interline pitch Pd of the data signal lines DL (Pg<Pd). In other words, each of the pixel regions is in a shape which is horizontally elongated, i.e., elongated in the row direction. Therefore, in the case of color display, for example, as illustrated in FIG. 3, the structure may be such that a pixel for red (R), a pixel for green (G), and a pixel for blue (B) are arranged periodically in this order in the column direction and pixels of the same color are arranged in the row direction.

The transparent pixel electrode PIT in plan view overlaps both the gate signal line GL for driving the pixel and a gate signal line GL being scanned next. Specifically, as illustrated in FIG. 2, in plan view, a right end region (shorter side on the right) of the transparent pixel electrode PIT formed in the pixel region of the pixel P1 overlaps the gate signal line GL1 for driving the pixel P1, and a lower end region (longer side at the bottom) thereof overlaps the gate signal line GL2 being scanned next. Similarly, a right end region of the transparent pixel electrode PIT formed in the pixel region of the pixel P2 overlaps the gate signal line GL2 for driving the pixel P2, and a lower end region thereof overlaps the gate signal line GL3 being scanned next.

The arrangement of the transparent pixel electrodes PIT is not limited to the one described above. For example, in plan view, the transparent pixel electrode PIT may overlap the gate signal line GL for driving the pixel but not overlap the gate signal line GL being scanned next. Specifically, the right end region and an upper end region (longer side at the top) of the transparent pixel electrode PIT formed in the pixel region of the pixel P1 may overlap the gate signal line GL1 but no region thereof may overlap the gate signal line GL2. Similarly, the right end region and the upper end region of the transparent pixel electrode PIT formed in the pixel region of the pixel P2 may overlap the gate signal line GL2 but no region thereof may overlap the gate signal line GL3.

Further, in the structure illustrated in FIG. 2, the right end region of the transparent pixel electrode PIT may not overlap the gate signal line GL. Specifically, the transparent pixel electrode PIT may overlap, in plan view, only the gate signal line GL adjacent to the gate signal line GL for driving the pixel, for example, the gate signal line GL being scanned next to the gate signal line GL for driving the pixel.

Here, a method of driving the liquid crystal display device LCD is described in brief. The gate signal line GL is formed of a low resistance metal layer, and the gate voltage for scanning is applied thereto from the scanning line drive circuit. The data signal line DL is also formed of a low resistance metal layer, and the data voltage for video is applied thereto from the data line drive circuit. When a gate-on voltage is applied to the gate signal line GL, a semiconductor layer SEM of the thin film transistor TFT is reduced in resistance. Then, the data voltage applied to the data signal line DL is transferred via a source electrode SM formed of a low resistance metal layer to the transparent pixel electrode PIT electrically connected to the source electrode SM.

The common voltage is applied from the common electrode drive circuit to the transparent common electrode CIT. The transparent common electrode CIT overlaps the transparent pixel electrode PIT via the insulating film (protective insulating film PAS; second insulating film). Slits (openings) are formed in the transparent common electrode CIT within each pixel region. An electric field for driving, which is generated from the transparent pixel electrode PIT via the slits in the transparent common electrode CIT and the liquid crystal layer LC to the transparent common electrode CIT, drives the liquid crystal layer LC to display an image.

Note that, the shape of the slit in the transparent common electrode CIT is not specifically limited, and may be in an elongated shape, or may be a typical opening in a rectangular shape or in an oval shape. Further, the width of the slit may be larger or smaller than the distance between adjacent slits.

In the pixel structure described above, the pixel region is in a horizontally elongated shape, and thus, in a region in which the transparent pixel electrode PIT is formed, regions adjacent to the data signal lines DL (right end region and left end region) are smaller than those in a case where the pixel region is in a vertically elongated shape. Therefore, the capacitances of the parasitic capacitors formed between the transparent pixel electrode PIT and the two data signal lines DL adjacent thereto on the right and on the left may be reduced. Further, in the pixel structure described above, the transparent pixel electrode PIT is formed so as to overlap the gate signal line GL, and, in the region in which the transparent pixel electrode PIT is formed, a region overlapping the gate signal line GL (upper end region or lower end region) may be increased to be larger than that in the case where the pixel region is in a vertically elongated shape. Therefore, the aperture ratio of a pixel may be improved. From the above, display unevenness due to a parasitic capacitor may be reduced and the aperture ratio of a pixel may be improved.

Figure 4:
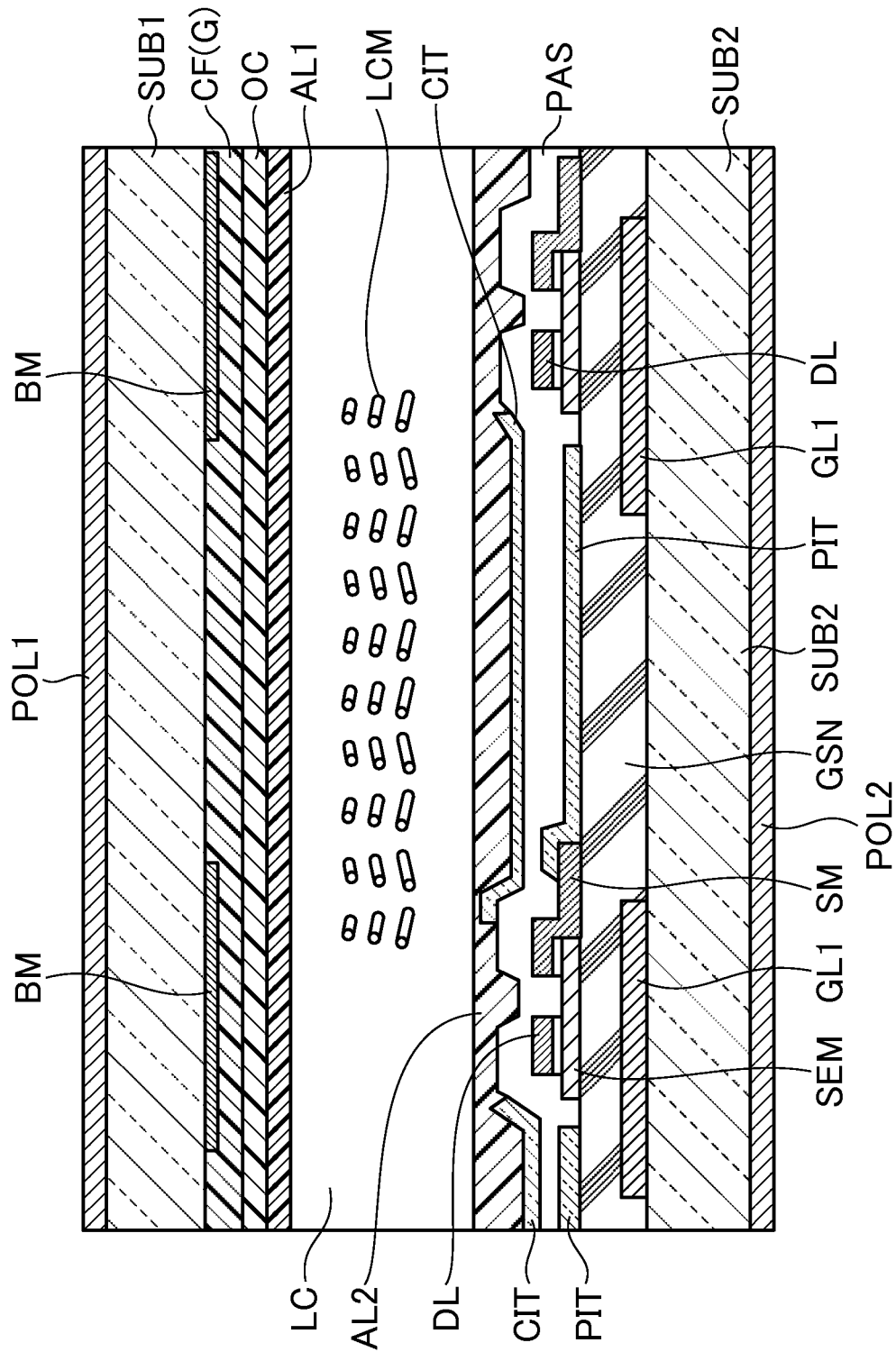
FIG. 4 is a sectional view of the liquid crystal display panel taken along the line 4-4' of FIG. 2.

Next, a sectional structure of a pixel is described. FIG. 4 is a sectional view taken along the line 4-4' of FIG. 2. The liquid crystal layer LC is sandwiched between two transparent substrates, that is, a first transparent substrate SUB1 (first substrate) on the display surface side and a second transparent substrate SUB2 (second substrate) on the rear surface side. Positive liquid crystal molecules LCM whose major axes are oriented along the direction of the electric field are encapsulated in the liquid crystal layer LC.

A first polarizing plate POL1 and a second polarizing plate POL2 are bonded to the outside of the first transparent substrate SUB1 and the second transparent substrate SUB2, respectively. With regard to the polarizing plates POL, a well-known structure may be used. A first alignment film AL1 on the display surface side and a second alignment film AL2 on the rear surface side, which may fix the liquid crystal molecules LCM, are formed on the liquid crystal layer LC. With regard to the alignment films AL, a well-known structure may be used. A surface of a color filter CF is covered with an overcoat film OC of an organic material.

When the semiconductor layer SEM is directly irradiated with outside light, the resistance of the semiconductor layer SEM may decrease, and thus the storage characteristics of the liquid crystal display device LCD may be lowered, which may inhibit satisfactory image display. Therefore, a black matrix BM is formed on the first transparent substrate SUB1 at a position above the semiconductor layer SEM. The black matrix BM is also arranged at a boundary between pixel regions in the color filter CF. This prevents color mixture caused when light beams of adjacent pixels are viewed from an oblique direction. Thus, the black matrix BM provides such a great effect that an image can be displayed without blurring. Note that, when the width of the black matrix BM is too large, the aperture ratio and the transmittance are reduced. Therefore, in order to achieve bright and low power consumption performance in a high resolution liquid crystal display device, it is preferred to minimize the width of the black matrix BM to the extent that color mixture is not caused when obliquely viewed. The black matrix BM is made of a resin material or a metal material using a black pigment.

The gate signal line GL is formed of a metal material containing aluminum Al, molybdenum Mo, titanium Ti, or copper Cu as a main component, a plurality of laminate layers made of the above, an alloy obtained by adding tungsten W, manganese Mn, or titanium Ti to the above-mentioned metal material, or a laminate metal layer obtained by combining the above.

A gate insulating film GSN (first insulating film) is formed so as to cover the gate signal line GL. As a material of the gate insulating film GSN, a well-known material may be used.

The semiconductor layer SEM and the transparent pixel electrode PIT are formed on the gate insulating film GSN. The data signal line DL and the source electrode SM of the thin film transistor TFT are formed on the semiconductor layer SEM. The transparent pixel electrode PIT is formed so as to cover a part of the source electrode SM and is electrically connected to the source electrode SM. The protective insulating film PAS is formed so as to cover the data signal line DL and the source electrode SM. As the protective insulating film PAS, silicon nitride SiN or silicon dioxide $SiO_2$ may be used. The transparent common electrode CIT is formed above the transparent pixel electrode PIT via the protective insulating film PAS.

In the structure described above, when an on-voltage is applied to the gate signal line GL, the data voltage is transferred via the data signal line DL, the semiconductor layer SEM, and the source electrode SM to the transparent pixel electrode PIT. The period during which an off-voltage is applied to the gate signal line GL is a retention period. In the retention period, the semiconductor layer SEM is increased in resistance, and thus, accumulated charge (voltage) is basically retained. However, the voltage at the transparent pixel electrode PIT may fluctuate by leakage due to the resistance of the semiconductor layer SEM or due to the resistance of the liquid crystal layer LC.

Figure 5:
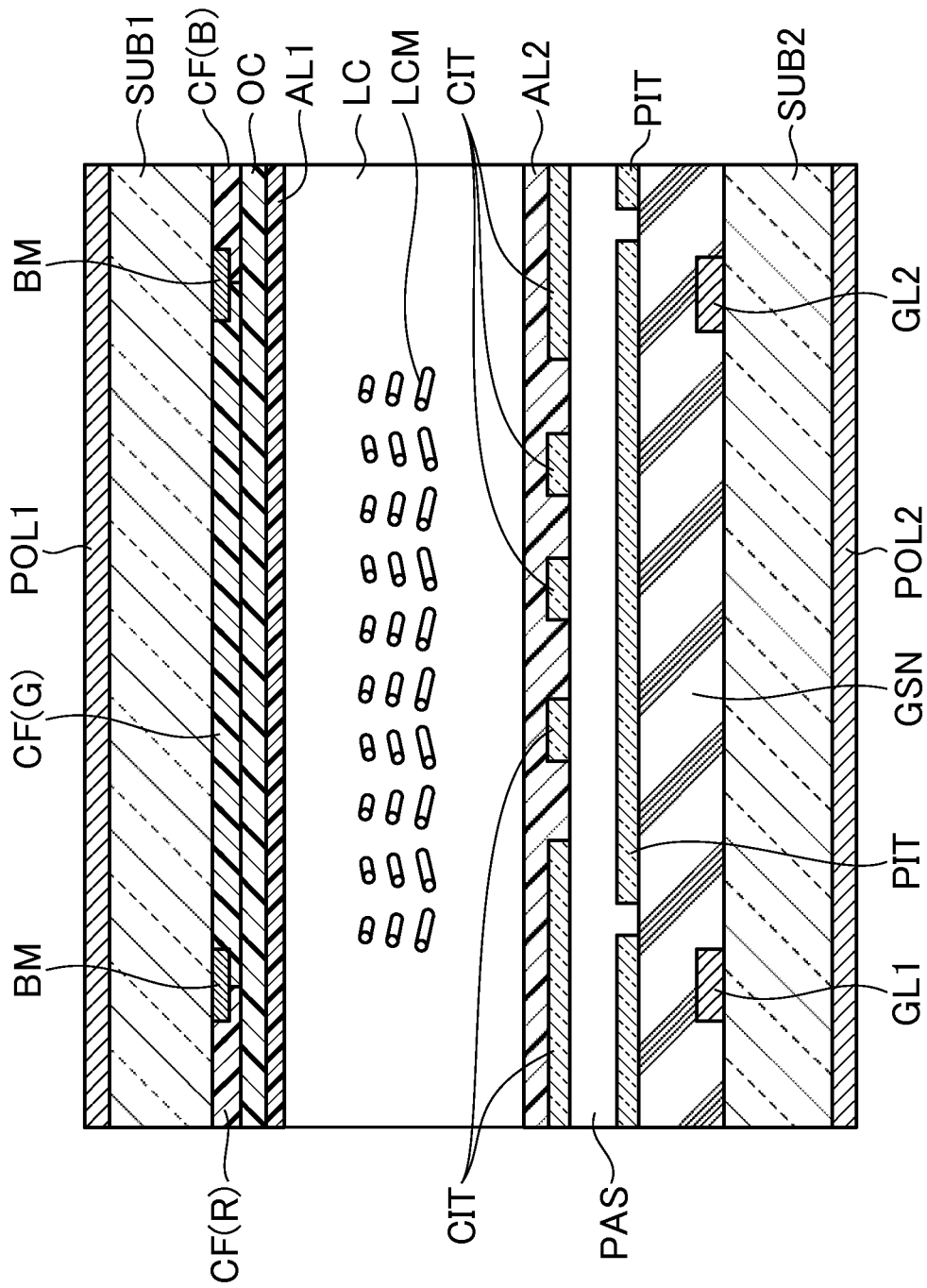
FIG. 5 is a sectional view of the liquid crystal display panel taken along the line 5-5' of FIG. 2.

FIG. 5 is a sectional view taken along the line 5-5' of FIG. 2. FIG. 5 is a sectional view of three pixels having the data signal lines DL as boundaries. The center pixel corresponds to a green color filter CF(G) in the color filter CF arrangement.

The left and right pixels correspond to a red color filter CF(R) and a blue color filter CF(B), respectively. Further, correspondingly to the pixel arrangement illustrated in FIG. 3, the color filters CF of the same color are arranged in the row direction while the color filters CF of different colors are periodically arranged in the column direction. At the boundary between the pixels at which the data signal line DL is arranged, the black matrix BM is formed on the inner surface of the first transparent substrate SUB1 across the liquid crystal layer LC.

The liquid crystal layer LC is filled with the liquid crystal molecules LCM which are an organic material. The first alignment film AL1 formed on the inner surface of the first transparent substrate SUB1 and the second alignment film AL2 formed on the inner surface of the second transparent substrate SUB2 are subjected to orientation treatment to fix the major axes of the liquid crystal molecules LCM.

Figure 6A:
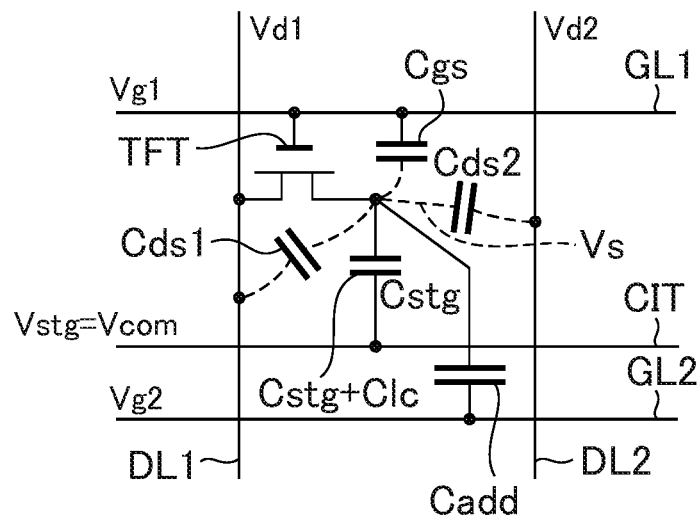
FIG. 6A is an equivalent circuit diagram illustrating capacitors formed in the pixel P1.

By the way, in the structure described above, capacitors are formed at a portion at which the transparent pixel electrode PIT and the gate signal line GL overlap. FIG. 2 illustrates capacitors formed in the pixels P1 and P2. FIG. 6A is an equivalent circuit diagram illustrating capacitors formed in the pixel P1.

A liquid crystal capacitor Clc and the storage capacitor Cstg are formed between the transparent pixel electrode PIT and the transparent common electrode CIT. Further, a parasitic capacitor Cds1 is formed between the transparent pixel electrode PIT and the data signal line DL1, and a parasitic capacitor Cds2 is formed between the transparent pixel electrode PIT and the data signal line DL2. Further, a parasitic capacitor Cgst is formed between the source electrode of the thin film transistor TFT and the gate signal line GL1, and a capacitor Cgsi is formed between the transparent pixel electrode PIT and the gate signal line GL1. In FIG. 6A, a capacitor Cgs which is the sum of the parasitic capacitor Cgst and the capacitor Cgsi is illustrated. Further, an additional capacitor Cadd is formed between the transparent pixel electrode PIT and the gate signal line GL2.

In the liquid crystal display device LCD according to this embodiment, as described above, the pixel region is in a horizontally elongated shape, and thus, the capacitances of the parasitic capacitors Cds1 and Cds2 can be reduced. The capacitor Cgs is formed between the source electrode of the thin film transistor TFT and the gate signal line GL1 and between the transparent pixel electrode PIT connected to the source electrode and the gate signal line GL1. Thus, there is a problem in that, at a trailing edge of a gate voltage Vg1 (when turned off), a jump-in voltage (feed through voltage) may be generated to lower a pixel potential Vs1. In this regard, according to this embodiment, the additional capacitor Cadd is formed between the transparent pixel electrode PIT and the gate signal line GL2 of the following stage, and thus, the pixel potential Vs1 rises at a leading edge of a gate voltage Vg2 (when turned on). The amount of the rise of the pixel potential has a correlation with the capacitance of the additional capacitor Cadd. Further, the capacitance of the additional capacitor Cadd has a correlation with the overlapping area of the transparent pixel electrode PIT and the gate signal line GL2. Therefore, in order to inhibit the potential fluctuations (lowering of the pixel potential) due to the capacitor Cgs, it is preferred to set the overlapping areas of the transparent pixel electrode PIT and the gate signal lines GL1 and GL2 so that the capacitor Cgs and the additional capacitor Cadd are substantially equal to each other.

Figure 6B:
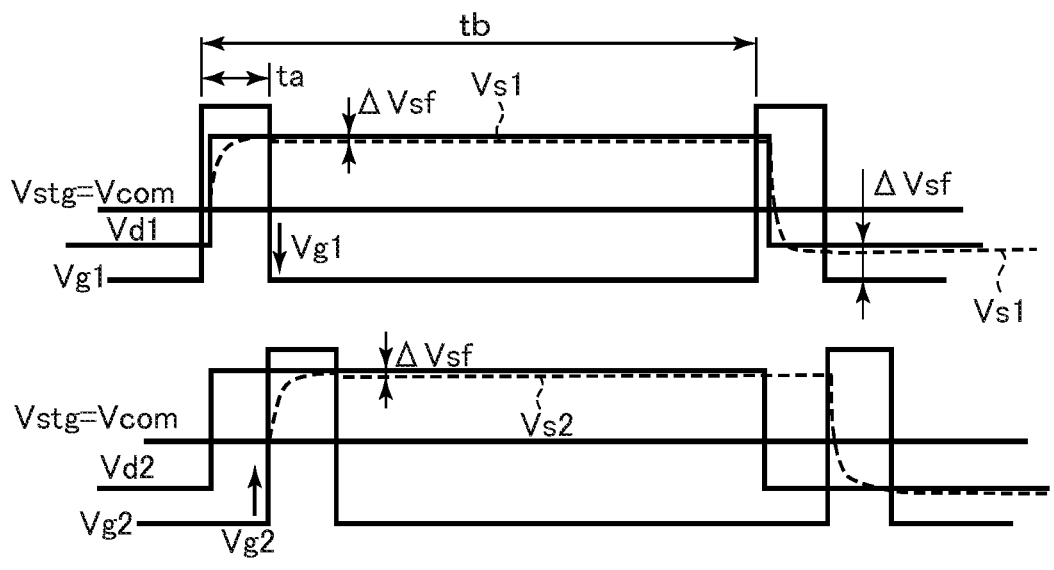
FIG. 6B is a timing chart illustrating various kinds of signals with regard to the pixel P1 and the pixel P2 of the following stage.

FIG. 6B is a timing chart illustrating various kinds of signals with regard to the pixel P1 and the pixel P2 of the following stage. As illustrated in FIG. 6B, with regard to the pixel potential Vs1 in the pixel P1, a jump-in voltage $\Delta Vsf$ is lowered or substantially cancelled by the gate voltage Vg2 which rises simultaneously with the fall of the gate voltage Vg1. This enables inhibition of fluctuations of the pixel potential Vs1.

Second Embodiment

A second embodiment of the present application is described in the following with reference to the drawings. Note that, for the sake of convenience of description, like reference symbols are used to designate members having the same functions as those described in the first embodiment, and description thereof is omitted.

Figure 7:
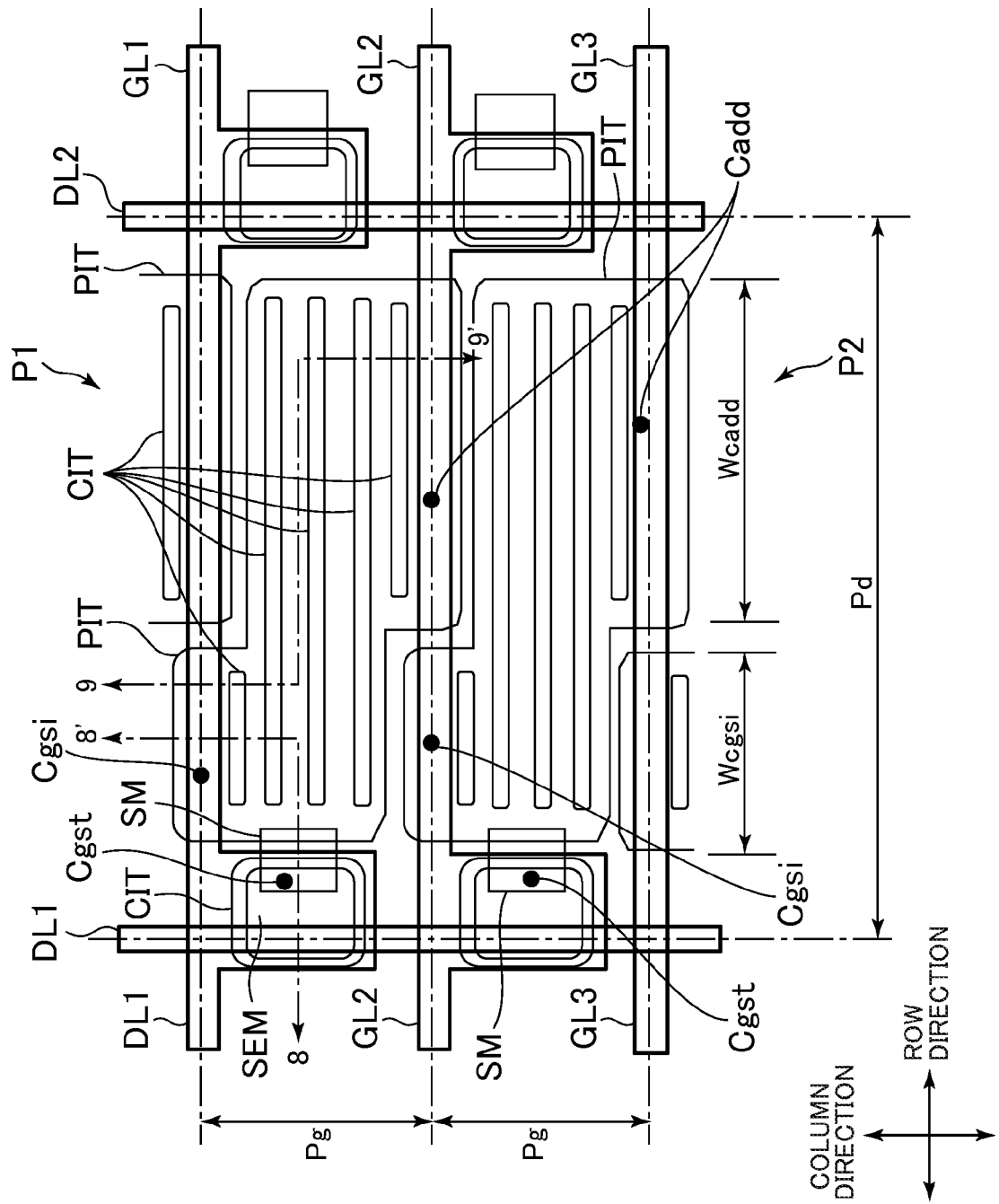
FIG. 7 is a plan view illustrating a structure of the two pixels P1 and P2 in a liquid crystal display panel according to a second embodiment of the present application.
Figure 8:
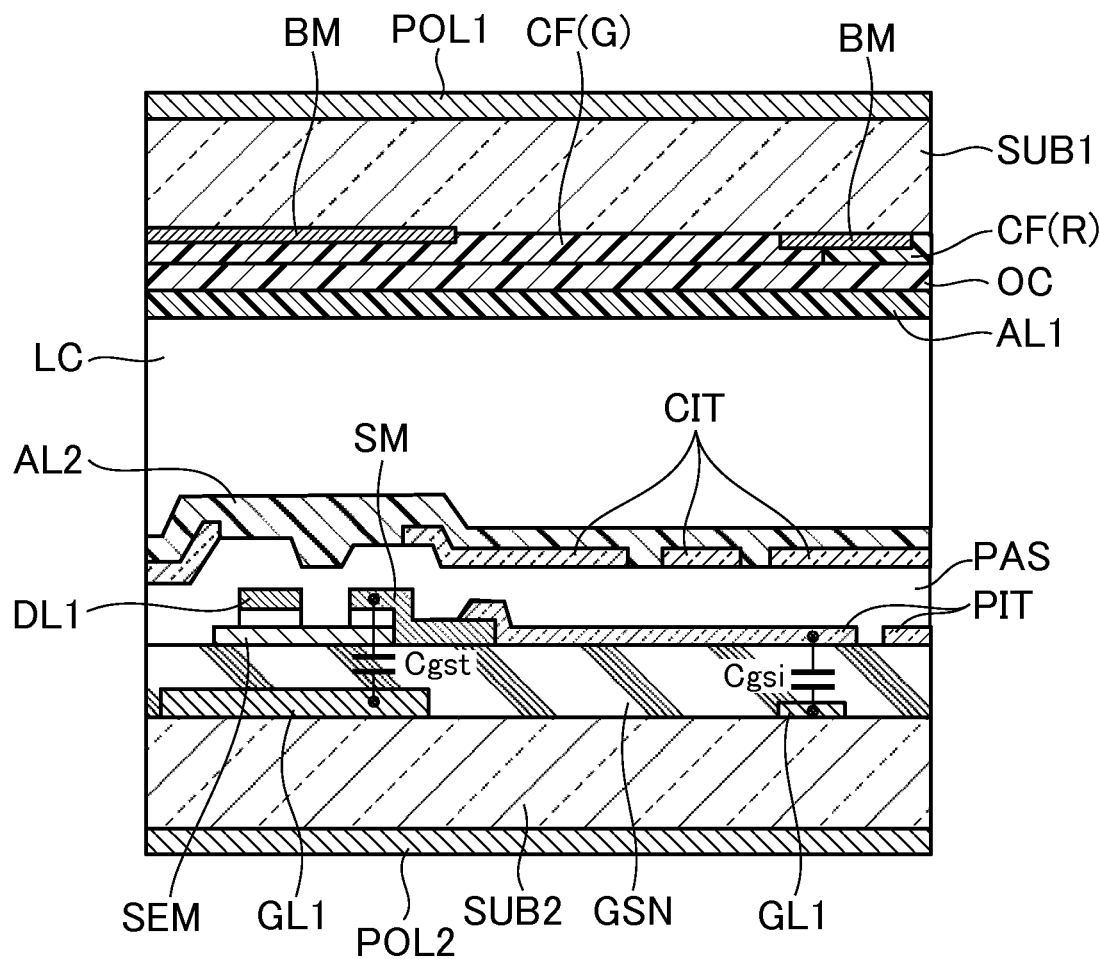
FIG. 8 is a sectional view of the liquid crystal display panel taken along the line 8-8' of FIG. 7.
Figure 9:
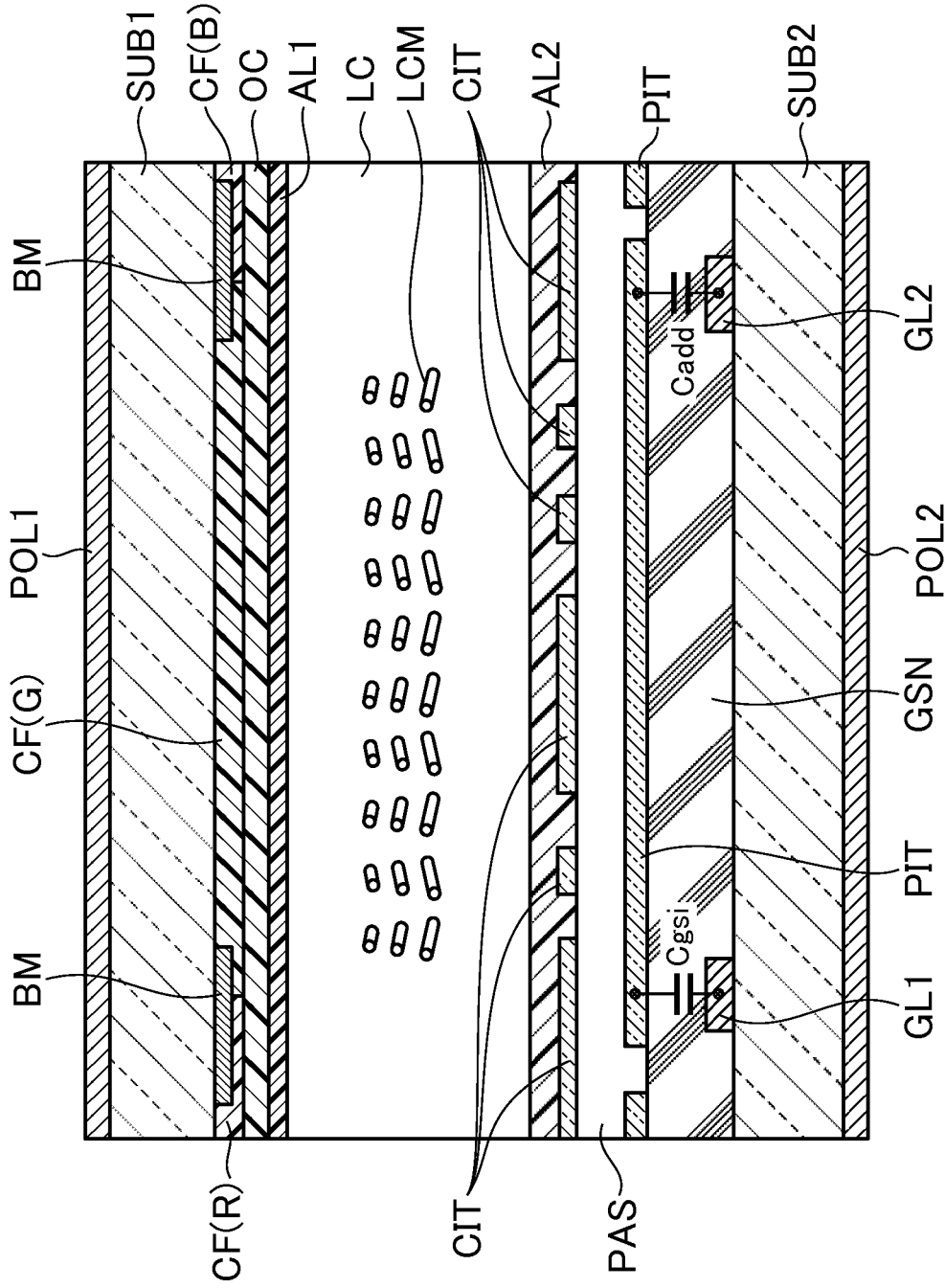
FIG. 9 is a sectional view of the liquid crystal display panel taken along the line 9-9' of FIG. 7.

An entire structure of a liquid crystal display device according to the second embodiment is the same as that illustrated in FIG. 1. FIG. 7 is a plan view illustrating a structure of the two pixels P1 and P2 in the liquid crystal display panel according to the second embodiment. FIG. 8 is a sectional view taken along the line 8-8' of FIG. 7. FIG. 9 is a sectional view taken along the line 9-9' of FIG. 7.

Similarly to the case of the first embodiment, the interline pitch Pg of the gate signal lines GL is smaller than the interline pitch Pd of the data signal lines DL (Pg<Pd). In other words, each of the pixel regions is in a shape which is horizontally elongated, i.e., elongated in the row direction.

The transparent pixel electrode PIT in plan view overlaps both the gate signal line GL for driving the pixel and a gate signal line GL being scanned next. Specifically, as illustrated in FIG. 7, in plan view, a left region at the upper end (longer side) of the transparent pixel electrode PIT formed in the pixel region of the pixel P1 overlaps the gate signal line GL1 for driving the pixel P1, and a right region at the lower end (longer side) thereof overlaps the gate signal line GL2 being scanned next. Similarly, a left region at the upper end (longer side) of the transparent pixel electrode PIT formed in the pixel region of the pixel P2 overlaps the gate signal line GL2 for driving the pixel P2, and a right region at the lower end (longer side) thereof overlaps the gate signal line GL3 being scanned next.

The arrangement of the transparent pixel electrodes PIT is not limited to the one described above. For example, in plan view, in the transparent pixel electrode PIT formed in the pixel region of the pixel P1, the right region (shorter side on the right) adjacent to the data signal line DL2 may overlap the gate signal line GL1 for driving the pixel as illustrated in FIG. 2. Similarly, in the transparent pixel electrode PIT formed in the pixel region of the pixel P2, the right region (shorter side on the right) adjacent to the data signal line DL2 may overlap the gate signal line GL2 for driving the pixel.

Further, the upper end (longer side at the top) of the transparent pixel electrode PIT may overlap the gate signal line GL for driving the pixel and the lower end (longer side at the bottom) thereof may overlap the gate signal line GL being scanned next. In other words, the gate signal line GL in plan view may overlap two transparent pixel electrodes PIT adjacent to each other in the column direction. Specifically, as illustrated in FIG. 10, the upper end region of the transparent pixel electrode PIT formed in the pixel region of the pixel P1 overlaps the gate signal line GL1, and the lower end region thereof overlaps the gate signal line GL2. Similarly, the upper end region of the transparent pixel electrode PIT formed in the pixel region of the pixel P2 overlaps the gate signal line GL2, and the lower end region thereof overlaps the gate signal line GL3.

In the pixel structure described above, similarly to the case of the first embodiment, the capacitances of the parasitic capacitors formed between the transparent pixel electrode PIT and the two data signal lines DL adjacent thereto on the right and on the left may be reduced. Further, the aperture ratio of a pixel may be improved.

As illustrated in FIG. 8 and FIG. 9, the transparent pixel electrode PIT formed in the pixel region of the pixel P1 overlaps the gate signal lines GL1 and GL2 via the gate insulating film GSN. Other points with regard to the sectional structure of the pixel are similar to those of the first embodiment (see FIG. 4 and FIG. 5).

By the way, in the structure described above, capacitors are formed at a portion at which the transparent pixel electrode PIT and the gate signal line GL overlap. FIG. 7 illustrates capacitors formed in the pixels P1 and P2. An equivalent circuit diagram illustrating the capacitors formed in the pixel P1 is the same as the one illustrated in FIG. 6A.

The liquid crystal capacitor Clc and the storage capacitor Cstg are formed between the transparent pixel electrode PIT and the transparent common electrode CIT. Further, the parasitic capacitor Cds1 is formed between the transparent pixel electrode PIT and the data signal line DL1, and the parasitic capacitor Cds2 is formed between the transparent pixel electrode PIT and the data signal line DL2. Further, the parasitic capacitor Cgst is formed between the source electrode of the thin film transistor TFT and the gate signal line GL1, and the capacitor Cgsi is formed between the transparent pixel electrode PIT and the gate signal line GL1. In FIG. 6A, the capacitor Cgs which is the sum of the parasitic capacitor Cgst and the capacitor Cgsi is illustrated. Further, the additional capacitor Cadd is formed between the transparent pixel electrode PIT and the gate signal line GL2.

In the liquid crystal display device LCD according to this embodiment, also, in order to inhibit the potential fluctuations (lowering of the pixel potential) due to the capacitor Cgs, it is preferred to set the overlapping areas of the transparent pixel electrode PIT and the gate signal lines GL1 and GL2 so that the capacitor Cgs and the additional capacitor Cadd are substantially equal to each other. Specifically, it is preferred that a width Wcgsi of a region of the transparent pixel electrode PIT which overlaps the gate signal line GL1 (see FIG. 7) and a width Wcadd of a region thereof which overlaps the gate signal line GL2 (see FIG. 7) be set so that the capacitor Cgs and the additional capacitor Cadd are substantially equal to each other. For example, in the transparent pixel electrode PIT, the width Wcgsi is set to be smaller than the width Wcadd (Wcgsi<Wcadd) so that a relational expression Cgst+Cgsi=Cadd is satisfied.

Further, it is preferred that the transparent pixel electrode PIT in plan view overlap and extend to across the gate signal line being scanned next to the gate signal line for driving the pixel. Specifically, with regard to the pixel P1 illustrated in FIG. 7, a region having the width Wcgsi extends upward to overlap the gate signal line GL1, and a region having the width Wcadd extends downward to overlap the gate signal line GL2. This enables the capacitances of the capacitor Cgsi and the additional capacitor Cadd to be held at fixed values even if the transparent pixel electrode PIT is displaced in the vertical direction (column direction).

[Manufacturing Method]

A method of manufacturing the second transparent substrate SUB2 (TFT substrate) in the liquid crystal display device LCD according to the embodiments described above is now described. As an example, a method of manufacturing the second transparent substrate SUB2 in the liquid crystal display device LCD illustrated in FIG. 7 is described.

FIG. 11A to FIG. 16B illustrate a manufacturing process of the thin film transistor TFT, a wiring region, and openings which are formed on the second transparent substrate SUB2. The figures are plan views of a pixel and sectional views taken along the line b-b' of the plan views for illustrating the manufacturing process.

Figure 11A:
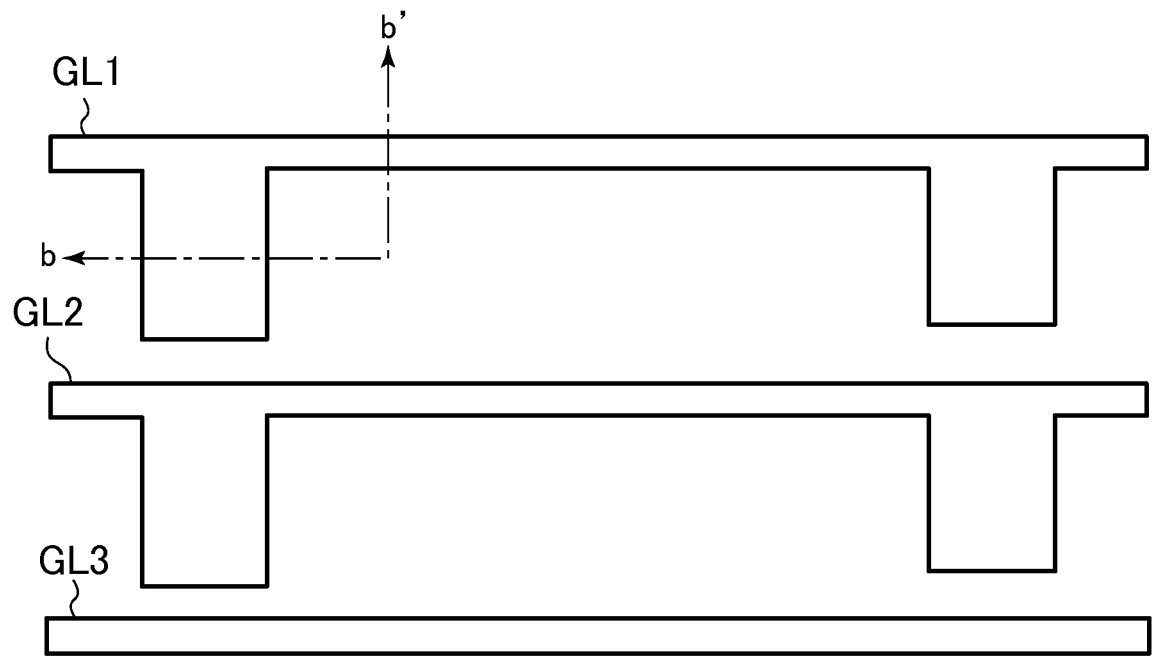
FIG. 11A is a plan view illustrating a first photoetching step in a TFT manufacturing process of the liquid crystal display panel illustrated in FIG. 7.
Figure 11B:
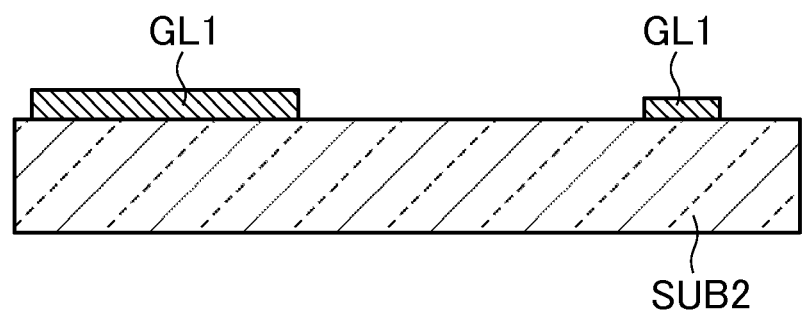
FIG. 11B is a sectional view of the liquid crystal display panel taken along the line b-b' of FIG. 11A.

FIG. 11A is a plan view of the pixel after a first photoetching step is completed, and FIG. 11B is a sectional view taken along the line b-b' of FIG. 11A. A metal material to be the gate signal line GL is formed on the glass substrate by sputtering, and is patterned in the first photoetching step. The patterning is carried out using halftone exposure. This forms the gate signal line GL as a planar pattern. The metal material is, for example, a laminate film formed of copper Cu at a thickness of 100 nm to 300 nm and molybdenum Mo formed thereon. As the metal wiring material, a laminate film of molybdenum Mo and aluminum Al, a laminate film of titanium Ti and aluminum Al, a MoW alloy of molybdenum Mo and tungsten W, or the like may also be used.

Figure 12A:
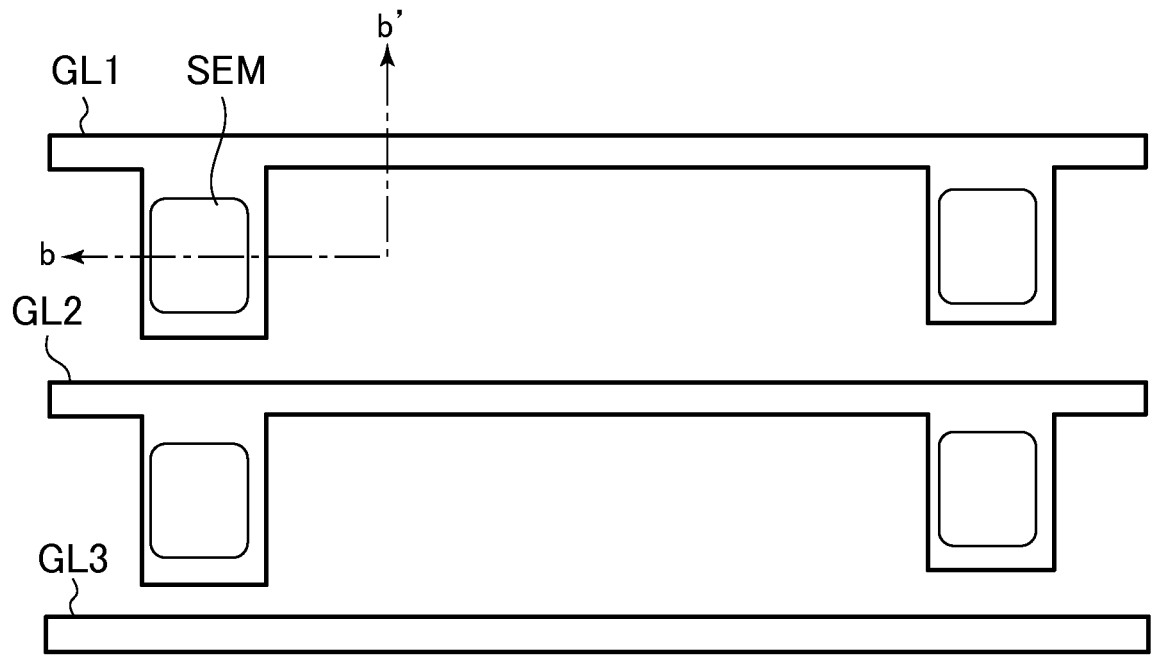
FIG. 12A is a plan view illustrating a second photoetching step in the TFT manufacturing process of the liquid crystal display panel illustrated in FIG. 7.
Figure 12B:
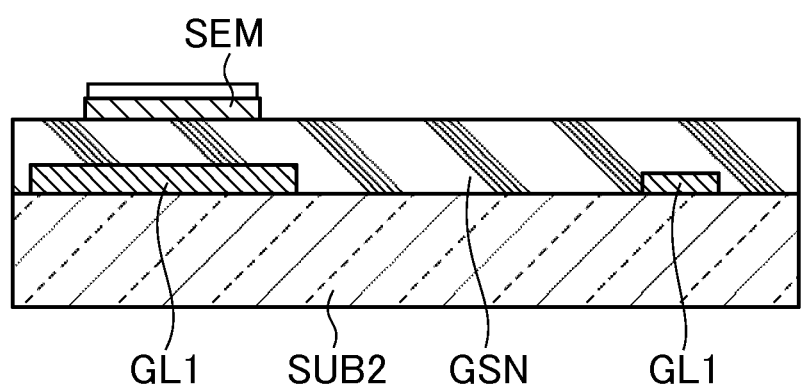
FIG. 12B is a sectional view of the liquid crystal display panel taken along the line b-b' of FIG. 12A.
Figure 13A:
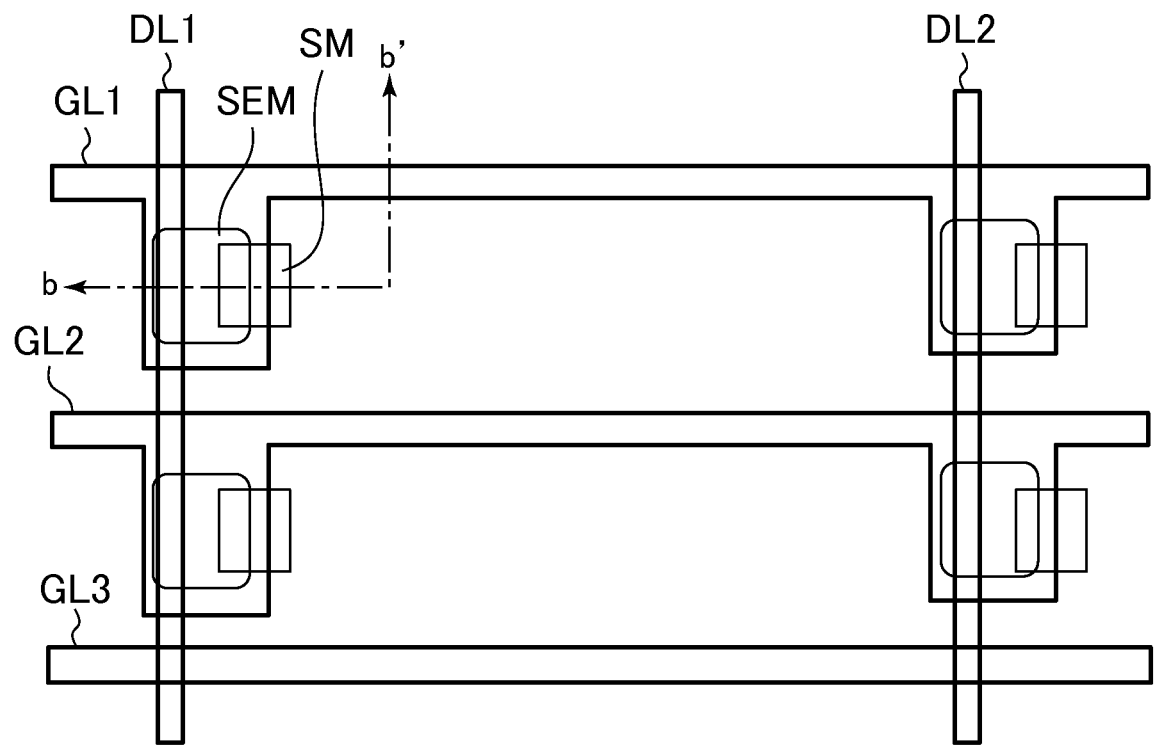
FIG. 13A is a plan view illustrating the second photoetching step in the TFT manufacturing process of the liquid crystal display panel illustrated in FIG. 7.
Figure 13B:
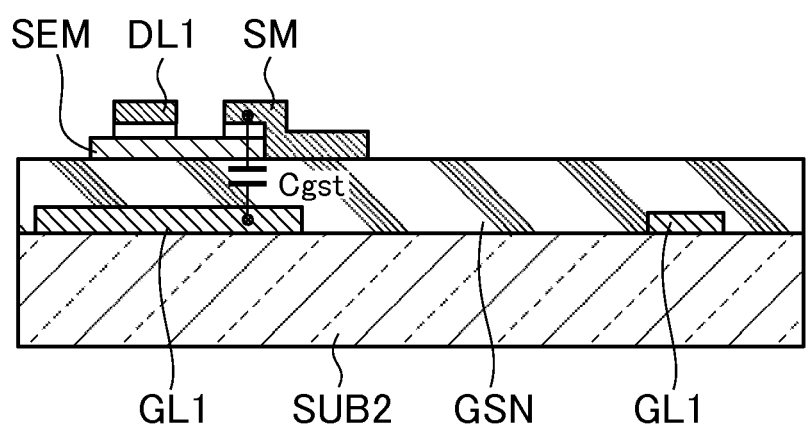
FIG. 13B is a sectional view of the liquid crystal display panel taken along the line b-b' of FIG. 13A.

FIG. 13A is a plan view of the pixel after a second photoetching step is completed, and FIG. 13B is a sectional view taken along the line b-b' of FIG. 13A. First, as illustrated in FIG. 12A and FIG. 12B, by chemical vapor deposition CVD, the gate insulating film GSN of silicon nitride is laminated so as to cover the gate signal line GL, and the semiconductor layer SEM of amorphous silicon is laminated on the gate insulating film GSN. Further, a laminate film of molybdenum Mo and copper Cu is formed on the semiconductor layer SEM by sputtering. As the metal wiring material, similarly to the material for the gate signal line GL, a laminate film of molybdenum Mo and aluminum Al, a laminate film of titanium Ti and aluminum Al, a MoW alloy of molybdenum Mo and tungsten W, or the like may also be used.

Then, as illustrated in FIG. 13A and FIG. 13B, the data signal line DL and the source electrode SM which is connected to the transparent pixel electrode PIT are simultaneously formed using halftone exposure. The semiconductor layer SEM is formed of two layers, that is, a low resistance semiconductor layer on a surface thereof containing phosphorus and a semiconductor layer containing a less amount of impurities. The low resistance semiconductor layer SEM is removed in a thin film transistor TFT region between the data signal line DL and the source electrode SM. When an on-voltage is applied to a gate electrode, electrons are induced at an interface of the gate insulating film GSN, the resistance is lowered, and on-operation is carried out.

Figure 14A:
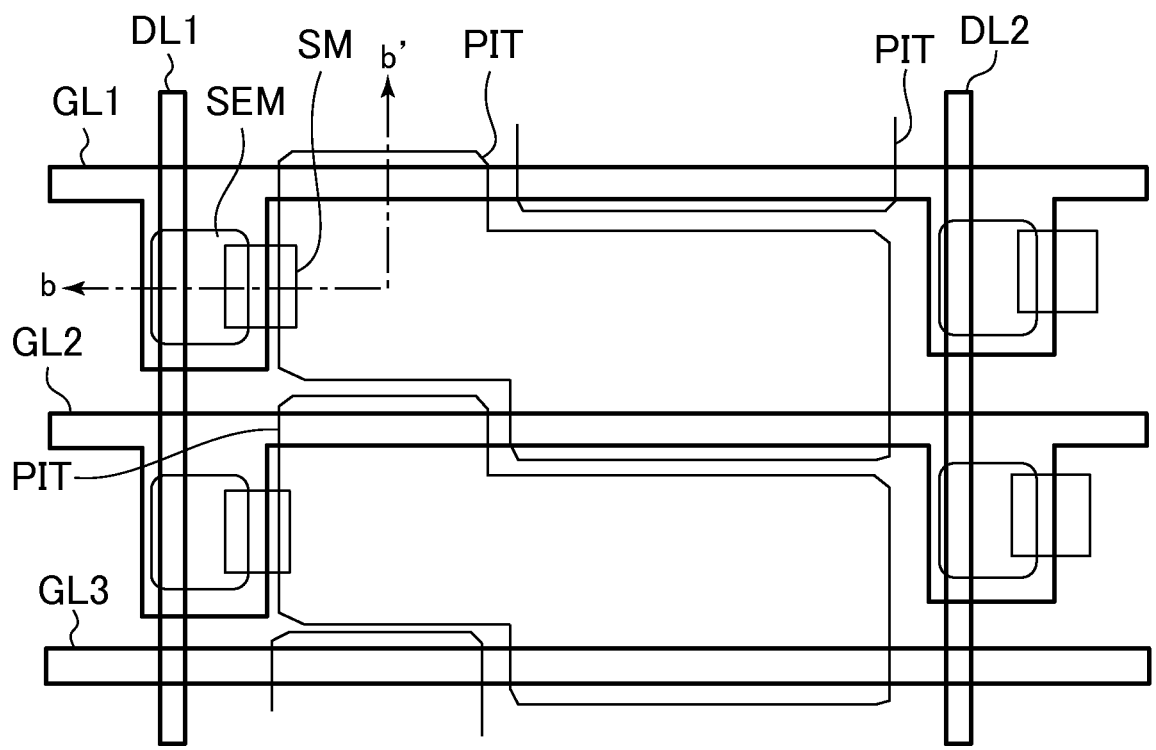
FIG. 14A is a plan view illustrating a third photoetching step in the TFT manufacturing process of the liquid crystal display panel illustrated in FIG. 7.
Figure 14B:
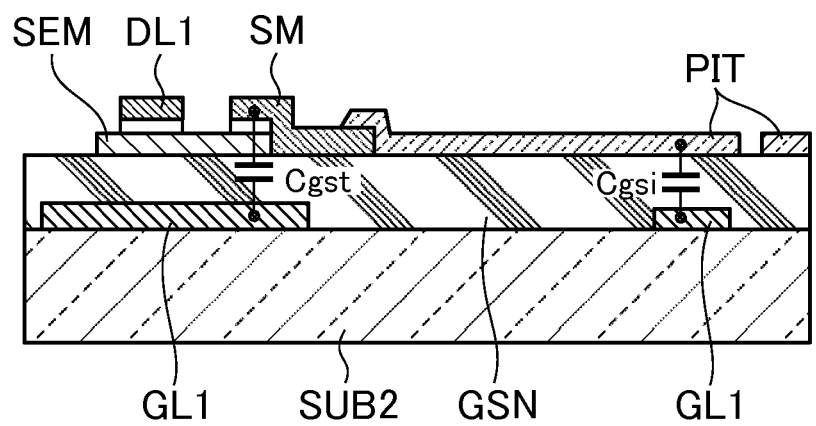
FIG. 14B is a sectional view of the liquid crystal display panel taken along the line b-b' of FIG. 14A.

FIG. 14A is a plan view of the pixel after a third photoetching step is completed, and FIG. 14B is a sectional view taken along the line b-b' of FIG. 14A. A film of indium tin oxide ITO which is a transparent electrode material is formed by sputtering on the data signal line DL and the source electrode SM, and, through the photoetching step, the transparent pixel electrode PIT is formed. The transparent pixel electrode PIT is directly formed on the source electrode SM. This electrically connects the transparent pixel electrode PIT and the source electrode SM to each other.

Figure 15A:
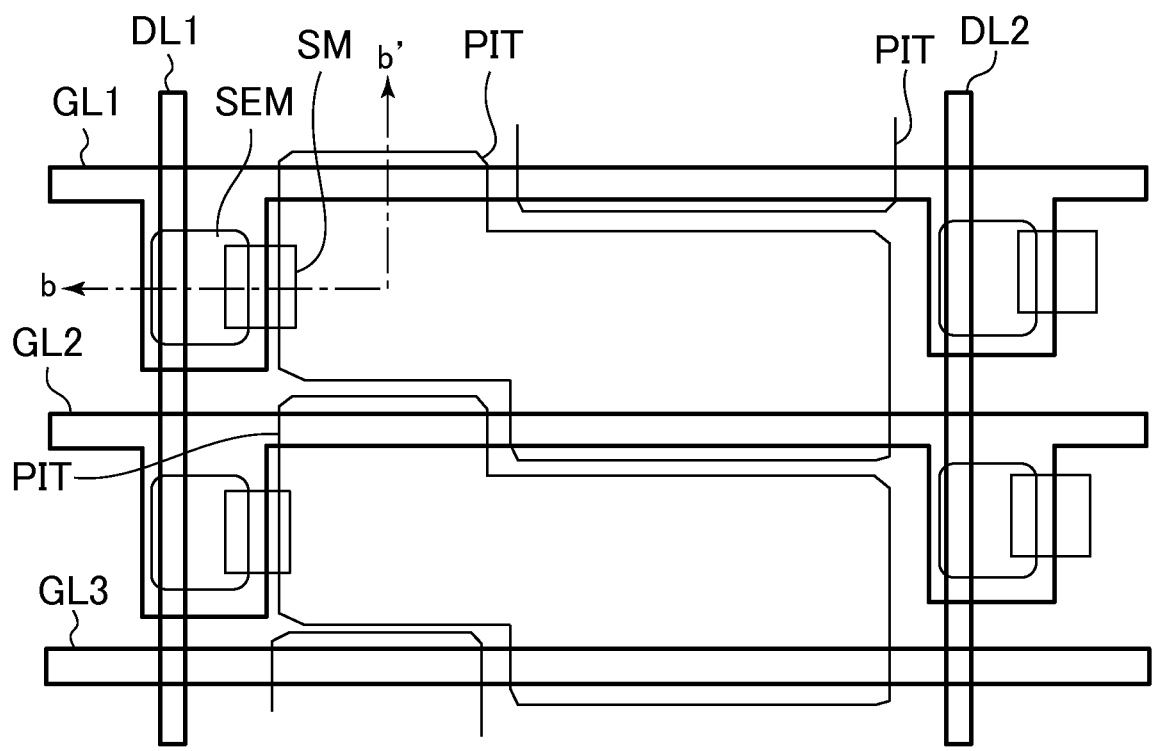
FIG. 15A is a plan view illustrating a fourth photoetching step in the TFT manufacturing process of the liquid crystal display panel illustrated in FIG. 7.
Figure 15B:
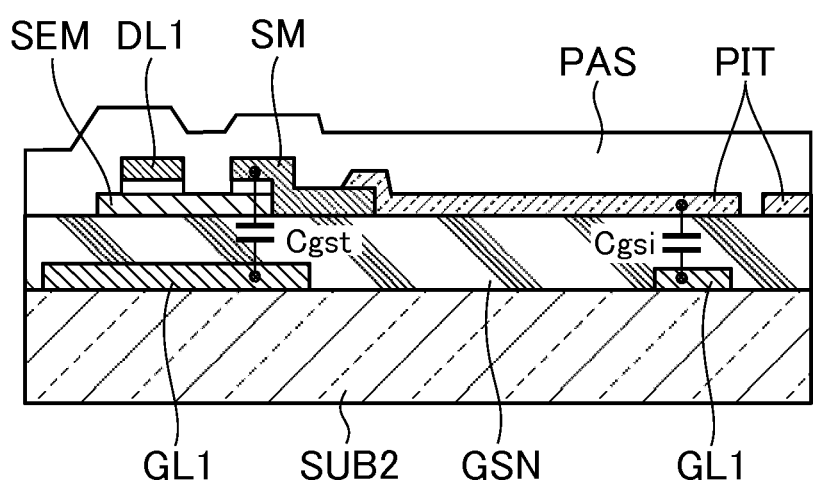
FIG. 15B is a sectional view of the liquid crystal display panel taken along the line b-b' of FIG. 15A.

FIG. 15A is a plan view of the pixel after a fourth photoetching step is completed, and FIG. 15B is a sectional view taken along the line b-b' of FIG. 15A. The protective insulating film PAS is formed so as to cover the transparent pixel electrode PIT. As the protective insulating film PAS, silicon nitride whose thickness is set to be 200 nm to 600 nm is used. Note that, although not illustrated, an opening for contact is formed outside the image display region DIA (see FIG. 1) in this step.

Figure 16A:
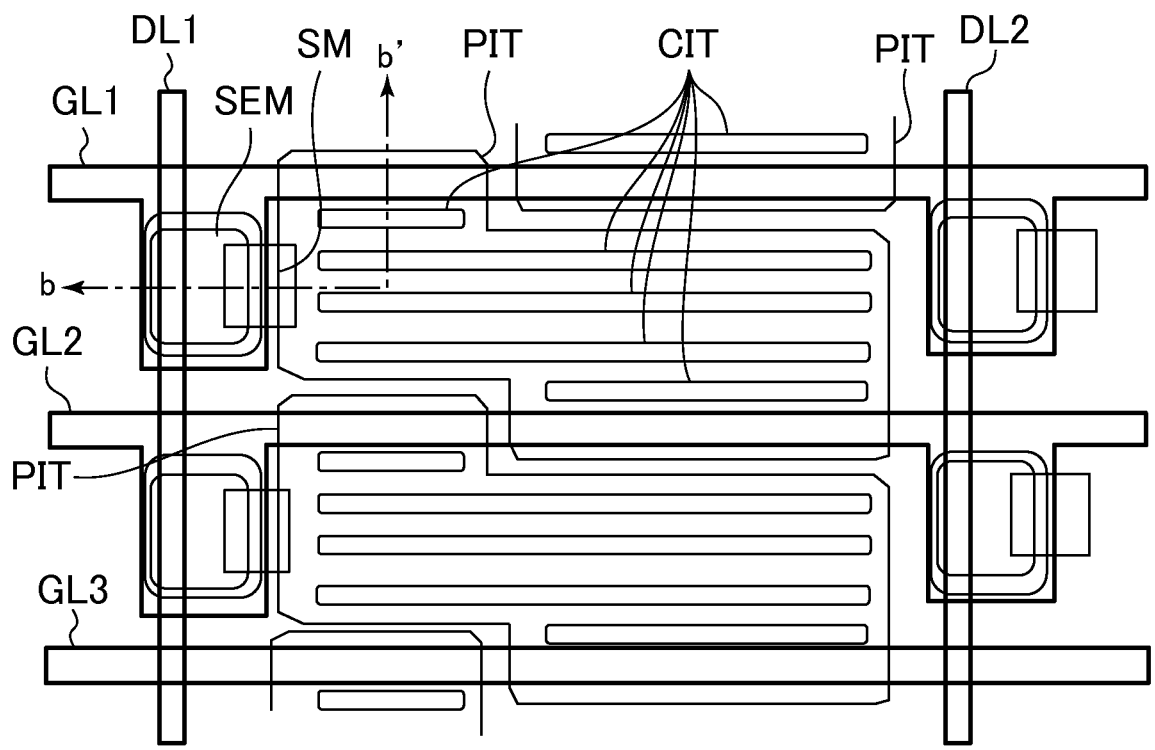
FIG. 16A is a plan view illustrating a fifth photoetching step in the TFT manufacturing process of the liquid crystal display panel illustrated in FIG. 7.
Figure 16B:
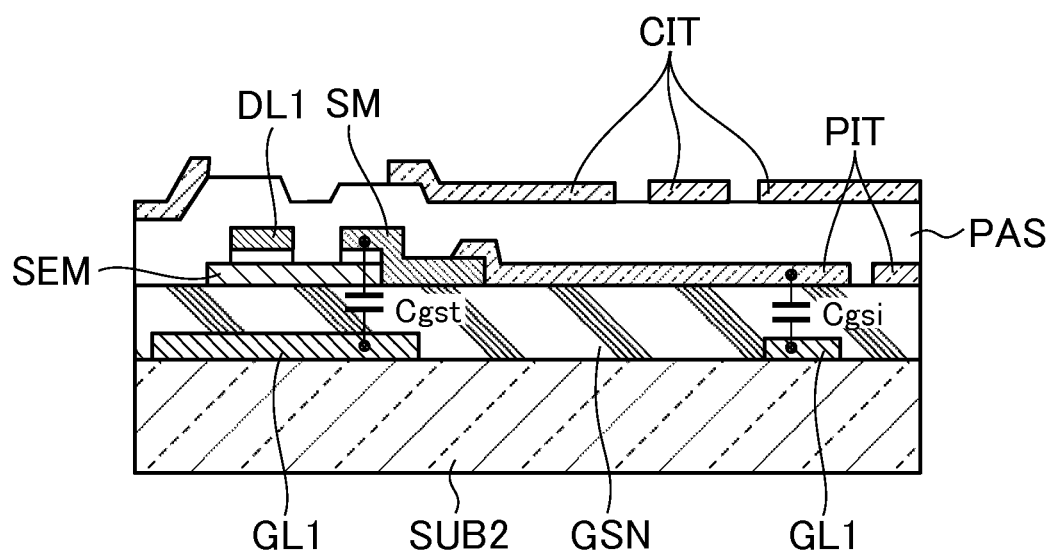
FIG. 16B is a sectional view of the liquid crystal display panel taken along the line b-b' of FIG. 16A.

FIG. 16A is a plan view of the pixel after a fifth photoetching step is completed, and FIG. 16B is a sectional view taken along the line b-b' of FIG. 16A. A film of indium tin oxide ITO which is the material for the transparent common electrode CIT is formed on the protective insulating film PAS, and after that, the transparent common electrode CIT is formed by photoetching.

As described above, the five photoetching steps may manufacture the second transparent substrate SUB2 of the liquid crystal display device LCD.

By the structures of the liquid crystal display devices according to the embodiments described above, the display unevenness may be reduced and the aperture ratio of a pixel may be improved in an IPS liquid crystal display device.

While there have been described what are at present considered to be certain embodiments of the application, it will be understood that various modifications may be made thereto, and it is intended that the appended claims cover all such modifications as fall within the true spirit and scope of the invention.

What is claimed is:

1. A liquid crystal display device, comprising:
    a first substrate on a display surface side and a second substrate on a rear surface side, the first substrate and the second substrate being placed so as to be opposed to each other with liquid crystal interposed therebetween, the second substrate comprising:
        a plurality of gate signal lines formed thereon, each of which extends in a row direction;
        a plurality of data signal lines formed thereon, each of which extends in a column direction;
        a plurality of pixel electrodes formed thereon, which are provided correspondingly to a plurality of pixels arranged in the row direction and the column direction; and
        a common electrode formed thereon, which is provided on the display surface side so as to be opposed to the plurality of pixel electrodes,
    wherein an interline pitch of the plurality of gate signal lines is smaller than an interline pitch of the plurality of data signal lines,
    wherein, in each of the plurality of pixels, the pixel electrode in a first pixel overlaps and extends to across, in plan view, both a gate signal line for driving the first pixel and a gate signal line of the plurality of gate signal lines which is scanned next to the gate signal line for driving the first pixel,
    wherein, in the each of the plurality of pixels, in plan view, a first overlapping area of the pixel electrode in a first pixel and the gate signal line for driving the first pixel is smaller than a second overlapping area of the pixel electrode in the first pixel and the gate signal line being scanned next to the gate signal line for driving the first pixel, and
    wherein the first overlapping area and the second overlapping area are arranged in zigzag.

2. The liquid crystal display device according to claim 1, wherein, in the each of the plurality of pixels, the gate signal line overlaps, in plan view, two of the plurality of pixel electrodes which are adjacent to each other in the column direction.

3. The liquid crystal display device according to claim 1, wherein the plurality of pixel electrodes are formed on an insulating film for covering the plurality of gate signal lines.

4. The liquid crystal display device according to claim 1, further comprising a plurality of colored portions formed on the second substrate, which are arranged correspondingly to the plurality of pixels, respectively,
    wherein the plurality of colored portions are arranged so that the colored portions of the same color are arranged in the row direction and the colored portions of different colors are periodically arranged in the column direction.

* * * * *